(12) United States Patent
Ning et al.

(10) Patent No.: US 10,960,391 B2
(45) Date of Patent: Mar. 30, 2021

(54) METHOD AND SYSTEM OF ELEMENTAL SULFUR RECYCLING AND CATALYST REGENERATING FOR SULFUR-DEPOSITED CATALYST

(71) Applicant: KUNMING UNIVERSITY OF SCIENCE AND TECHNOLOGY, Kunming (CN)

(72) Inventors: Ping Ning, Kunming (CN); Qiulin Zhang, Kunming (CN); Tengxiang Zhang, Kunming (CN); Yaqing Zhang, Kunming (CN); Huimin Wang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 16/696,773

(22) Filed: Nov. 26, 2019

(65) Prior Publication Data
US 2020/0164355 A1 May 28, 2020

(30) Foreign Application Priority Data
Nov. 28, 2018 (CN) .......................... 201811432891.2

(51) Int. Cl.
*B01J 38/66* (2006.01)
*C01B 17/02* (2006.01)
*C01B 17/027* (2006.01)

(52) U.S. Cl.
CPC ........... *B01J 38/66* (2013.01); *C01B 17/0205* (2013.01); *C01B 17/027* (2013.01)

(58) Field of Classification Search
CPC ....... Y02P 20/584; B01J 38/66; B01J 23/882; B01J 23/94; B01J 23/90; C01B 17/027; C01B 17/0205; C01B 17/021
See application file for complete search history.

(56) References Cited

U.S. PATENT DOCUMENTS

| | | | | |
|---|---|---|---|---|
| 1,640,668 A * | 8/1927 | Prudhomme | ............ | B01J 23/90 502/34 |
| 2,643,939 A * | 6/1953 | Porter | ...................... | B01J 37/10 423/572 |
| 3,457,046 A * | 7/1969 | Hoekstra | ................. | C01B 17/06 423/571 |
| 3,856,925 A * | 12/1974 | Kodera | .................... | C01B 32/70 423/416 |
| 4,908,201 A * | 3/1990 | Cabanaw | ............ | C01B 17/0439 423/574.1 |
| 5,169,819 A * | 12/1992 | Berrebi | ..................... | B01J 37/20 502/168 |
| 5,270,272 A * | 12/1993 | Galperin | .................. | B01J 29/90 208/140 |
| 6,235,259 B1 * | 5/2001 | Ledoux | ............. | B01D 53/8615 423/573.1 |
| 8,889,579 B2 * | 11/2014 | Leonard | ................ | C07C 5/3337 502/53 |
| 2007/0196257 A1 * | 8/2007 | Khattaty | ................... | B01J 38/70 423/220 |
| 2007/0292337 A1 * | 12/2007 | Startsev | ............... | B01D 53/485 423/576.2 |
| 2008/0011646 A1 * | 1/2008 | Giroux | ..................... | C01B 3/38 208/133 |
| 2010/0018118 A1 * | 1/2010 | Hassan | ................... | C01B 17/05 48/127.9 |
| 2011/0256039 A1 * | 10/2011 | Liu | ...................... | B01J 20/0229 423/140 |
| 2013/0252801 A1 * | 9/2013 | Leonard | ................ | C07C 5/3337 502/53 |

FOREIGN PATENT DOCUMENTS

| | | | | | |
|---|---|---|---|---|---|
| CN | 102310006 A | * | 1/2012 | ............. | B01J 38/02 |
| FR | 3 022 472 B1 | * | 1/2020 | .......... | B01J 27/0515 |

* cited by examiner

Primary Examiner — Timothy C Vanoy
(74) Attorney, Agent, or Firm — Innovation Capital Law Group, LLP; Vic Lin

(57) ABSTRACT

The present invention discloses a method and system of recovering elemental sulfur and regenerating the catalyst for a sulfur-deposited catalyst, including immersing the sulfur-deposited catalyst in the ammonium sulfide solution, the leaching reaction under normal pressure and temperature, replacing the ammonium sulfide solution and immersing again for extraction for the same time; collecting the leachate of the two steps, conducting gas stripping of the elemental sulfur by adopting the high-temperature nitrogen gas, condensing the tail gas of gas stripping, subjecting to a purification treatment and then discharging, with the liquor condensate being the ammonium sulfide solution. Finally, the solid in the leachate is filtered, washed and dried after the gas stripping to obtain the elemental sulfur; and the washing and drying of catalysts that has been subjected to the two times of immersion and extraction obtain the regenerated catalysts.

10 Claims, 1 Drawing Sheet

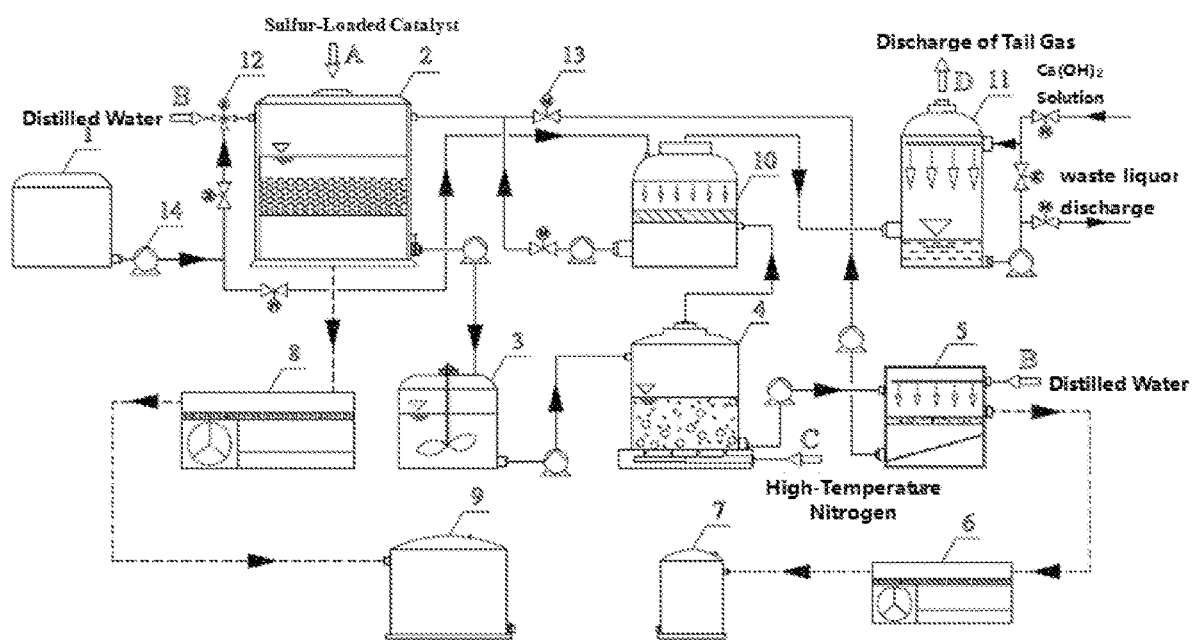

US 10,960,391 B2

METHOD AND SYSTEM OF ELEMENTAL SULFUR RECYCLING AND CATALYST REGENERATING FOR SULFUR-DEPOSITED CATALYST

TECHNICAL FIELD

The present invention belongs to the technical field of catalyst regeneration and sulfur recovery, and particularly relates to a method and system of elemental sulfur recovering and catalyst regenerating for a sulfur-deposited catalyst.

BACKGROUND

The catalytic reduction of $SO_2$ by CO can generate the elemental sulfur, depositing on the catalyst surface, which is extracted from the catalyst usually requiring the harsh conditions. In general, the external conditions of the elemental sulfur recovery and catalyst regeneration are very rigorous, such as the temperatures over 450-500° C. are required for the processes of high-temperature extraction and active-carbon calcination. Both of them obviously have the high energy consumption and the latter needs to prevent the carbon deposition and the fast inactivation of the catalyst. Sulfur condensation may occur on the catalyst during the high-temperature extraction process. Although these problems can be avoided through special technologies, the sulfur recovery rate in this case is distinctly lower than that achieved during normal operation of the system. The technologies of sulfur recovery have been extensively studied by researchers at home and abroad, but there are still many technical problems in a practical application, including the technology of direct oxidation reactor where the formation of liquid sulfur over the catalyst is affected by the operating temperature and/or getting command of the generation of the $H_2S$ by-product is difficult. Currently, the methods of recovering elemental sulfur and catalyst regeneration from the sulfur-deposited catalysts almost all belong to that without using a solution, and especially no mention has been mentioned about a method using solution leaching yet.

SUMMARY

The present invention provides a method and system for recovering elemental sulfur and the catalyst regeneration from a sulfur-deposited catalyst, where ammonium sulfide is reacted with the elemental sulfur deposited on the catalyst to form ammonium polysulfides, such that the elemental sulfur is converted into a solution, and then ammonium polysulfide is facilitated to decompose into the elemental sulfur by the gas stripping manner of high-temperature $N_2$ and further the elemental sulfur are concentrated by solvent evaporation. This can realize high-efficiency recovery of the elemental sulfur and the regeneration of the catalyst from the sulfur-deposited catalyst.

The technical solution of the present invention is as follows.

A method of recovering elemental sulfur and regenerating the catalyst for a sulfur-deposited catalyst, including specific steps of:

(1) The sulfur-deposited catalysts are immersed into the ammonium sulfide solution maintaining the reaction at room temperature for 6-10 hours, and then the ammonium sulfide solution is replaced for a fresh solution, further immersing the catalysts at the same amount of time. Wherein this procedure is repeated for more than two times;

(2) Collecting all the leachate of step (1), then the gas stripping of the elemental sulfur by using a high-temperature nitrogen gas of 90-110° C. is carried out, condensing the tail gas of gas stripping. The tail gas is subjected to a purification treatment to let out. In addition, the turbid liquid by the enrichment is filtered, and the solid are washed and dried to obtain the elemental sulfur; and (3) The catalysts, that has subjected to immersion and extraction for many times in step (1), are washed and dried to obtain the regenerated catalysts.

In step (1) the mass fraction of the ammonium sulfide solution is 16.5%-20%.

In step (1) the solid-liquid volume ratio of the sulfur-deposited catalyst to the ammonium sulfide solution is 1:3.5-6.

In step (2) the condensate used during the condensation is the ammonium sulfide solution same as that in step (1).

In step (2) the purification treatment is a contact reaction between the tail gas and the alkali solution, the alkali solution is calcium hydroxide solution, sodium hydroxide solution or potassium hydroxide solution. The concentration of the alkali solution is 1.85-2.52 g/cm$^3$.

In step (2) the dried temperature is 50-60° C.

In step (3) the catalyst is washed through immersing into water for 3-5 times and the solid-liquid volume ratio of the catalyst to water is 1:2.5-5.

In step (3) the dried temperature is 80-100° C.

The present invention also provides a system for recovering elemental sulfur and the catalyst regeneration from a sulfur-deposited catalyst, which includes an ammonium sulfide storage tank 1, a sulfur leaching reactor 2, a ammonium polysulfide storage tank 3, an elemental sulfur gas stripping reactor 4, a solid-liquid separator 5, an elemental sulfur dryer 6, a sulfur storage tank 7, a catalyst dryer 8, a catalyst storage tank 9, a cooling tower 10, a tail gas purification tower 11, an alkali solution storage tank 15, and a waste liquor storage tank 16; the ammonium sulfide storage tank 1 is connected to the top of the sulfur leaching reactor 2 through a pump 14, a three-way solenoid valve 12 and a two-way electrically operated valve 13 are disposed between the pump 14 and the sulfur leaching reactor 2, the three-way solenoid valve 12 is also connected to a distilled water pipe, and an inlet for the sulfur-deposited catalyst is provided on the top of the sulfur leaching reactor 2; the bottom of the sulfur leaching reactor 2 is connected to the ammonium polysulfide storage tank 3 through a pump, the ammonium polysulfide storage tank 3 is connected to the elemental sulfur gas stripping reactor 4 through a pump, the elemental sulfur gas stripping reactor 4 is provided with an inlet for a high-temperature nitrogen gas at the bottom thereof, the bottom of the elemental sulfur gas stripping reactor 4 is connected to the solid-liquid separator 5 through a pump, the solid-liquid separator 5 is internally provided with a spraying device, the spraying device is connected to a distilled water pipe, the solid-liquid separator 5 is connected to the elemental sulfur dryer 6, the elemental sulfur dryer 6 is connected to the sulfur storage tank 7; the bottom of the solid-liquid separator 5 is connected to the sulfur leaching reactor 2 through a pump, and a two-way electrically operated valve is disposed between the pump and the sulfur leaching reactor 2; the top of the elemental sulfur gas stripping reactor 4 is connected to the cooling tower 10, the cooling tower 10 is internally provided with a spraying device, the spraying device is connected to the ammonium sulfide storage tank 1 through the pump 14, the bottom of the cooling tower 10 is connected to the sulfur leaching reactor 2 through a pump, a two-way electrically operated valve is arranged between the pump and the sulfur leaching reactor 2, the top of the cooling tower 10 is connected to the lower portion of the tail gas purification tower 11, the tail gas purification tower 11 is provided with a tail gas outlet on the top thereof, the tail gas purification tower 11 is internally provided with a spraying device, the spraying device is connected to the bottom of the tail gas purification tower 11 through a circulation pump, a two-way electrically operated valve is arranged between the circulation pump and the spraying device, the spraying device is also connected to the alkali solution storage tank 15, a two-way electrically operated valve is arranged between the spraying device and the alkali solution storage tank 15, the circulation pump is also connected to the waste liquor storage tank 16, and a two-way electrically operated valve is arranged between the circulation pump and the waste liquor storage tank 16; and the bottom of the sulfur leaching reactor 2 is connected to the catalyst dryer 8, and the catalyst dryer is connected to the catalyst storage tank 9.

The ammonium polysulfide storage tank 3 is internally provided with a stirring device.

Using the system of the present invention to recover the elemental sulfur from the sulfur-deposited catalyst and regenerate the catalyst includes the specific steps of:

(1) High-efficiency sulfur extraction by immersing in an ammonium sulfide solution under normal temperature and pressure:

the sulfur-deposited catalyst is added into the sulfur leaching reactor 2 from the inlet, the two-way electrically operated valve 13 is opened, the pump 14 is communicated with the sulfur leaching reactor 2 through the three-way solenoid valve 12, the ammonium sulfide solution in the ammonium sulfide storage tank 1 is pumped into the sulfur leaching reactor 2, the sulfur-deposited catalyst is completely immersed in the ammonium sulfide solution, and allowed to stand for the leaching reaction under normal temperature and normal pressure for 6-10 hours, and after the leaching is completed, the leachate, i.e., the ammonium polysulfide solution generated through the reaction is pumped into the ammonium polysulfide storage tank 3, fresh ammonium sulfide solution is replaced to conduct extraction by immersion again for the same time, the leaching process is repeated for more than two times to ensure the complete leaching of the elemental sulfur, and after the leaching is completed, the ammonium polysulfide solution generated through the reaction is pumped into the ammonium polysulfide storage tank 3;

(2) Gas stripping of the elemental sulfur through a low temperature reaction:

the leachate of step (1) is combined into the ammonium polysulfide storage tank 3 and uniformly stirred, and then the ammonium polysulfide solution is pumped into the elemental sulfur gas stripping reactor 4, the high-temperature nitrogen gas of 90-110° C. enters the elemental sulfur gas stripping reactor 4 from the bottom thereof to contact with the ammonium polysulfide solution, the tail gas enters the bottom of the cooling tower 10 from the top of the elemental sulfur gas stripping reactor 4, the two-way electrically operated valve disposed between the top of the cooling tower 10 and the pump 14 is opened, the ammonium sulfide solution in the ammonium sulfide storage tank 1 is sprayed into the cooling tower 10 from the spraying device inside the cooling tower 10, the two-way electrically operated valve disposed between the cooling tower 10 and the sulfur leaching reactor 2 is opened such that the liquor condensate collected at the bottom of the cooling tower 10 is pumped into the sulfur leaching reactor 2 for recycling, the condensed tail gas enters the tail gas purification tower 11 from the top of the cooling tower 10, the two-way electrically operated valve between the tail gas purification tower 11 and the alkali solution storage tank 15 is opened to spray the alkali solution in the tail gas purification tower 11, the sprayed alkali solution is recycled and pumped back into the tail gas purification tower 11 for spraying, the purified tail gas is exhausted into air, and after running for a period of time, the alkali solution is not recycled and pumped into the waste liquor storage tank 16;

the elemental sulfur generated through reaction at the bottom of the elemental sulfur gas stripping reactor 4 is pumped into the solid-liquid separator 5 together with the reaction solution for solid-liquid separation, the internal spraying device of the solid-liquid separator 5 sprays distilled water to wash the separated solid, and the washed elemental sulfur enters the elemental sulfur dryer 6 for drying treatment, and then enters the sulfur storage tank 7 for storage;

(3) Regeneration of the catalyst with low energy consumption:

the three-way solenoid valve 12 is switched on to pump the distillation water into the sulfur leaching reactor 2, the leached catalyst is allowed to stand and subjected to washing, the washed catalyst is dried in the catalyst dryer 8, and the dried catalyst is placed in the catalyst storage tank 9 for storage.

In the present invention, the reaction occurred during the process of leaching sulfur in ammonium sulfide is: $(NH_4)_2S+xS=(NH_4)_2S_{x+1}$. This reaction can fully extract the sulfur deposited on the catalyst with high extraction efficiency, and does not need high-temperature conditions during the reaction process, including not needing any additional high-temperature to facilitate reaction during gas stripping process of the elemental sulfur. The reaction occurred during the gas stripping process for the ammonium polysulfide solution is: $(NH_4)_2S_{x+1}=H_2S+Sx+2NH_3$.

Compared with the prior art, the present invention has the following advantages.

(1) In the present invention, the sulfur on the catalyst is extracted by the wet leaching method, the ammonium sulfide solution is used as the leaching agent, the reaction can be carried out at a normal temperature without high temperature and high pressure conditions, and thus can avoid the technical problems occurred during the sulfur recovery process of a conventional Claus method. This method has a good energy-saving property and safety, has great advantages compared with the traditional dry process, and has very little influence on the overall structure of the catalyst. The use of the solution leaching method can also avoid the aforementioned technical problems occurred during the traditional sulfur recovery process.

(2) Extracting sulfur on the catalyst by leaching using the ammonium sulfide solution has a high removal efficiency reaching more than 98%.

(3) The stripping gas used for recovering the elemental sulfur by decomposing the ammonium polysulfide is high-temperature $N_2$, which can avoid additional high temperature and high pressure conditions, and the tail gas can meet the discharge standard after purified by the alkali solution.

(4) The catalyst regeneration does not require high temperature and high pressure conditions, and does not affect the catalytic performance of the regenerated catalyst.

(5) The system equipment and the production process are simple, and the technological process is safe and reliable.

BRIEF DESCRIPTION OF THE DRAWINGS

FIG. 1 is a schematic diagram of the system for recovering the elemental sulfur and the catalyst regeneration for the sulfur-deposited catalyst according to the present invention.

DESCRIPTION

The present invention is further illustrated by the following examples, but it should be noted that the scope of the present invention is not limited by these examples.

FIG. 1 is a schematic diagram of the system for recovering the elemental sulfur and the catalyst regeneration for the sulfur-deposited catalyst according to the present invention. In the figure: 1 represents the ammonium sulfide storage tank; 2 represents the sulfur leaching reactor; 3 represents the ammonium polysulfide storage tank; 4 represents the elemental sulfur gas stripping reactor; 5 represents the solid-liquid separator; 6 represents the elemental sulfur dryer; 7 represents the sulfur storage tank; 8 represents the catalyst dryer; 9 represents the catalyst storage tank; 10 represents the cooling tower; 11 represents the tail gas purification tower; 12 represents the three-way solenoid valve; 13 represents the two-way electrically operated valve; 14 represents the pump; 15 represents the alkali solution storage tank; 16 represents the waste liquor storage tank; and in the figure the solid straight line represents a solution connecting pipe, and the virtual straight line represents the solid conveying route.

EXAMPLE 1

A system of recovering elemental sulfur and the catalyst regenerating towards a sulfur-deposited catalyst included a ammonium sulfide storage tank 1, a sulfur leaching reactor 2, a ammonium polysulfide storage tank 3, an elemental sulfur gas stripping reactor 4, a solid-liquid separator 5, an elemental sulfur dryer 6, a sulfur storage tank 7, a catalyst dryer 8, a catalyst storage tank 9, a cooling tower 10, a tail gas purification tower 11, an alkali solution storage tank 15, and a waste liquor storage tank 16; the ammonium sulfide storage tank 1 was connected to the top of the sulfur leaching reactor 2 through a pump 14, a three-way solenoid valve 12 and a two-way electrically operated valve 13 were disposed between the pump 14 and the sulfur leaching reactor 2, the three-way solenoid valve 12 was also connected to a distilled water pipe, and an inlet for the sulfur-deposited catalyst was provided on the top of the sulfur leaching reactor 2; the bottom of the sulfur leaching reactor 2 was connected to the ammonium polysulfide storage tank 3 through a pump, the ammonium polysulfide storage tank 3 was connected to the elemental sulfur gas stripping reactor 4 through a pump, the elemental sulfur gas stripping reactor 4 was provided with an inlet for a high-temperature nitrogen gas at the bottom thereof, the bottom of the elemental sulfur gas stripping reactor 4 was connected to the solid-liquid separator 5 through a pump, the solid-liquid separator 5 was internally provided with a spraying device, the spraying device was connected to a distilled water pipe, the solid-liquid separator 5 was connected to the elemental sulfur dryer 6, the elemental sulfur dryer 6 was connected to the sulfur storage tank 7; the bottom of the solid-liquid separator 5 was connected to the sulfur leaching reactor 2 through a pump, and a two-way electrically operated valve was disposed between the pump and the sulfur leaching reactor 2; the top of the elemental sulfur gas stripping reactor 4 was connected to the cooling tower 10, the cooling tower 10 was internally provided with a spraying device, the spraying device was connected to the ammonium sulfide storage tank 1 through the pump 14, the bottom of the cooling tower 10 was connected to the sulfur leaching reactor 2 through a pump, a two-way electrically operated valve was arranged between the pump and the sulfur leaching reactor 2, the top of the cooling tower 10 was connected to the lower portion of the tail gas purification tower 11, the tail gas purification tower 11 was provided with a tail gas outlet on the top thereof, the tail gas purification tower 11 was internally provided with a spraying device, the spraying device was connected to the bottom of the tail gas purification tower 11 through a circulation pump, a two-way electrically operated valve was arranged between the circulation pump and the spraying device, the spraying device was also connected to the alkali solution storage tank 15, a two-way electrically operated valve was arranged between the spraying device and the alkali solution storage tank 15, the circulation pump was also connected to the waste liquor storage tank 16, and a two-way electrically operated valve was arranged between the circulation pump and the waste liquor storage tank 16; and the bottom of the sulfur leaching reactor 2 was connected to the catalyst dryer 8, and the catalyst dryer was connected to the catalyst storage tank 9.

Using the system of this example to recover the elemental sulfur and regenerate the catalyst for the sulfur-deposited catalyst included the specific steps of:

(1) High-efficiency sulfur extraction by immersing in an ammonium sulfide solution under normal temperature and pressure:

the selected sulfur-deposited catalyst was the catalyst after catalytic reduction of $SO_2$ by $Co_{15}Mo_{10}/Al_2O_3$, which was added into the sulfur leaching reactor 2 from the inlet, the two-way electrically operated valve 13 was opened, the pump 14 was communicated with the sulfur leaching reactor 2 through the three-way solenoid valve 12, the ammonium sulfide solution of the ammonium sulfide storage tank 1 was pumped into the sulfur leaching reactor 2 with the mass fraction of the ammonium sulfide solution being 16.5%, the sulfur-deposited catalyst was completely immersed in the ammonium sulfide solution with the solid-liquid volume ratio of the sulfur-deposited catalyst to the ammonium sulfide solution being 1:3.5, and allowed to stand for the leaching reaction under normal temperature and normal pressure for 6 hours, and after the leaching was completed, the leachate, i.e., the ammonium polysulfide solution generated through the reaction, was pumped into the ammonium polysulfide storage tank 3, fresh ammonium sulfide solution was replaced to conduct extraction by immersion again for the same time, the leaching process was repeated for two times to ensure the complete leaching of the elemental sulfur, and after the leaching was completed, the ammonium polysulfide solution generated through the reaction was pumped into the ammonium polysulfide storage tank 3;

(2) Gas stripping of the elemental sulfur through a low temperature reaction:

the leachate of step (1) was combined into the ammonium polysulfide storage tank 3 and uniformly stirred, and then the ammonium polysulfide solution was pumped into the elemental sulfur gas stripping reactor 4, the high-temperature nitrogen gas of 90° C. entered the elemental sulfur gas stripping reactor 4 from the bottom thereof to contact with the ammonium polysulfide solution, the tail gas entered the bottom of the cooling tower 10 from the top of the elemental sulfur gas stripping reactor 4, the two-way electrically operated valve disposed between the top of the cooling tower 10 and the pump 14 was opened, the ammonium sulfide solution of the ammonium sulfide storage tank 1 was sprayed into the cooling tower 10 from the spraying device inside the cooling tower 10, the two-way electrically operated valve disposed between the cooling tower 10 and the sulfur leaching reactor 2 was opened such that the liquor condensate collected at the bottom of the cooling tower 10 was pumped into the sulfur leaching reactor 2 for recycling, the condensed tail gas entered the tail gas purification tower 11 from the top of the condensation tower 10, the two-way electrically operated valve between the tail gas purification tower 11 and the alkali solution storage tank 15 was opened to spray the alkali solution of a calcium hydroxide melt solution at the concentration of 2.52 $g/cm^3$ in the tail gas purification tower 11, the sprayed alkali solution was recycled and pumped back into the tail gas purification tower 11 for spraying, the purified tail gas was exhausted into air, and after running treatment of 3 batches of tail gas, the alkali solution was not recycled and pumped into the waste liquor storage tank 16;

the elemental sulfur generated through reaction at the bottom of the elemental sulfur gas stripping reactor 4 was pumped into the solid-liquid separator 5 together with the reaction solution for solid-liquid separation, the internal spraying device of the solid-liquid separator 5 sprayed distilled water to wash the separated solid by spraying, and the washed elemental sulfur entered the elemental sulfur dryer 6 for drying treatment, and then entered the sulfur storage tank 7 for storage, where the drying temperature was 50° C., and the drying time is 24 hours;

(3) Regeneration of the catalyst with low energy consumption:

the three-way solenoid valve 12 was switched on to pump the distillation water into the sulfur leaching reactor 2, the leached catalyst was allowed to stand and subjected to washing, the catalyst was washed by immersing in water for 3 h with the solid-liquid volume ratio of the catalyst to water of 1:2.5, the washed catalyst was dried in the catalyst dryer 8 at 80° C. for 24 hours, and the dried catalyst was placed in the catalyst storage tank 9 for storage.

EXAMPLE 2

Using the system of Example 1 to recover the elemental sulfur and regenerate the catalyst for the sulfur-deposited catalyst included the specific steps of:

(1) High-efficiency sulfur extraction by immersing in an ammonium sulfide solution under normal temperature and pressure:

the selected sulfur-deposited catalyst was the catalyst after catalytic reduction of $SO_2$ by $Co_{15}Mo_{10}/Al_2O_3$, which was added into the sulfur leaching reactor 2 from the inlet for the sulfur-deposited catalyst, the two-way electrically operated valve 13 was opened, the pump 14 was communicated with the sulfur leaching reactor 2 through the three-way solenoid valve 12, the ammonium sulfide solution of the ammonium sulfide storage tank 1 was pumped into the sulfur leaching reactor 2 with the mass fraction of the ammonium sulfide solution being 18%, the sulfur-deposited catalyst was completely immersed in the ammonium sulfide solution with the solid-liquid volume ratio of the sulfur-deposited catalyst to the ammonium sulfide solution being 1:5, and allowed to stand for the leaching reaction under normal temperature and normal pressure for 8 hours, and after the leaching was completed, the leachate, i.e., the ammonium polysulfide solution generated through the reaction, was pumped into the ammonium polysulfide storage tank 3, fresh ammonium sulfide solution was replaced to conduct extraction by immersion again for the same time, the leaching process was repeated for three times to ensure the complete leaching of the elemental sulfur, and after the leaching was completed, the ammonium polysulfide solution generated through the reaction was pumped into the ammonium polysulfide storage tank 3;

(2) Gas stripping of the elemental sulfur through a low temperature reaction:

the leachate of step (1) was combined into the ammonium polysulfide storage tank 3 and uniformly stirred, and then the ammonium polysulfide solution was pumped into the elemental sulfur gas stripping reactor 4, the high-temperature nitrogen gas of 100° C. entered the elemental sulfur gas stripping reactor 4 from the bottom thereof to contact with the ammonium polysulfide solution, the tail gas entered the bottom of the cooling tower 10 from the top of the elemental sulfur gas stripping reactor 4, the two-way electrically operated valve disposed between the top of the cooling tower 10 and the pump 14 was opened, the ammonium sulfide solution in the ammonium sulfide storage tank 1 was sprayed into the cooling tower 10 from the spraying device inside the cooling tower 10, the two-way electrically operated valve disposed between the cooling tower 10 and the sulfur leaching reactor 2 was opened such that the liquor condensate collected at the bottom of the cooling tower 10 was pumped into the sulfur leaching reactor 2 for recycling, the condensed tail gas entered the tail gas purification tower 11 from the top of the condensation tower 10, the two-way electrically operated valve between the tail gas purification tower 11 and the alkali solution storage tank 15 was opened to spray the alkali solution of a sodium hydroxide melt solution at the concentration of 2 $g/cm^3$ in the tail gas purification tower 11, the sprayed alkali solution was recycled and pumped back into the tail gas purification tower 11 for spraying, the purified tail gas was exhausted into air, and after running treatment of 3 batches of tail gas, the alkali solution was not recycled and pumped into the waste liquor storage tank 16;

the elemental sulfur generated through reaction at the bottom of the elemental sulfur gas stripping reactor 4 was pumped into the solid-liquid separator 5 together with the reaction solution for solid-liquid separation, the internal spraying device of the solid-liquid separator 5 sprayed distilled water to wash the separated solid by spraying, and the washed elemental sulfur entered the elemental sulfur dryer 6 for drying treatment, and then entered the sulfur storage tank 7 for storage, where the drying temperature was 55° C., and the drying time is 30 hours;

(3) Regeneration of the catalyst with low energy consumption:

the three-way solenoid valve 12 was switched on to pump the distillation water into the sulfur leaching reactor 2, the leached catalyst was allowed to stand and subjected to washing, the catalyst was washed by immersing in water for 5 h with the solid-liquid volume ratio of the catalyst to water of 1:4, the washed catalyst was dried in the catalyst dryer 8 at 90° C. for 30 hours, and the dried catalyst was placed in the catalyst storage tank 9 for storage.

EXAMPLE 3

Using the system of Example 1 to recover the elemental sulfur and regenerate the catalyst for the sulfur-deposited catalyst included the specific steps of:

(1) High-efficiency sulfur extraction by immersing in an ammonium sulfide solution under normal temperature and pressure:

the selected sulfur-deposited catalyst was the catalyst after catalytic reduction of $SO_2$ by $Co_{15}Mo_{10}/Al_2O_3$, the sulfur-deposited catalyst was added into the sulfur leaching reactor 2 from the inlet for the sulfur-deposited catalyst, the two-way electrically operated valve 13 was opened, the pump 14 was communicated with the sulfur leaching reactor 2 through the three-way solenoid valve 12, the ammonium sulfide solution of the ammonium sulfide storage tank 1 was pumped into the sulfur leaching reactor 2 with the mass fraction of the ammonium sulfide solution being 20%, the sulfur-deposited catalyst was completely immersed in the ammonium sulfide solution with the solid-liquid volume ratio of the sulfur-deposited catalyst to the ammonium sulfide solution being 1:6, and allowed to stand for the leaching reaction under normal temperature and normal pressure for 10 hours, and after the leaching was completed, the leachate, i.e., the ammonium polysulfide solution generated through the reaction, was pumped into the ammonium polysulfide storage tank 3, fresh ammonium sulfide solution was replaced to conduct extraction by immersion again for the same time, the leaching process was repeated for four times to ensure the complete leaching of the elemental sulfur, and after the leaching was completed, the ammonium polysulfide solution generated through the reaction was pumped into the ammonium polysulfide storage tank 3;

(2) Gas stripping of the elemental sulfur through a low temperature reaction:

the leachate of step (1) was combined into the ammonium polysulfide storage tank 3 and uniformly stirred, and then the ammonium polysulfide solution was pumped into the elemental sulfur gas stripping reactor 4, the high-temperature nitrogen gas of 110° C. entered the elemental sulfur gas stripping reactor 4 from the bottom thereof to contact with the ammonium polysulfide solution, the tail gas entered the bottom of the cooling tower 10 from the top of the elemental sulfur gas stripping reactor 4, the two-way electrically operated valve disposed between the top of the cooling tower 10 and the pump 14 was opened, the ammonium sulfide solution in the ammonium sulfide storage tank 1 was sprayed into the cooling tower 10 from the spraying device inside the cooling tower 10, the two-way electrically operated valve disposed between the cooling tower 10 and the sulfur leaching reactor 2 was opened such that the liquor condensate collected at the bottom of the cooling tower 10 was pumped into the sulfur leaching reactor 2 for recycling, the condensed tail gas entered the tail gas purification tower 11 from the top of the condensation tower 10, the two-way electrically operated valve between the tail gas purification tower 11 and the alkali solution storage tank 15 was opened to spray the alkali solution of a sodium hydroxide melt solution at the concentration of 1.85 g/cm³ in the tail gas purification tower 11, the sprayed alkali solution was recycled and pumped back into the tail gas purification tower 11 for spraying, the purified tail gas was exhausted into air, and after running treatment of 3 batches of tail gas, the alkali solution was not recycled and pumped into the waste liquor storage tank 16;

the elemental sulfur generated through reaction at the bottom of the elemental sulfur gas stripping reactor 4 was pumped into the solid-liquid separator 5 together with the reaction solution for solid-liquid separation, the internal spraying device of the solid-liquid separator 5 sprayed distilled water to wash the separated solid by spraying, and the washed elemental sulfur entered the elemental sulfur dryer 6 for drying treatment, and then entered the sulfur storage tank 7 for storage, where the drying temperature was 60° C., and the drying time is 28 hours;

(3) Regeneration of the catalyst with low energy consumption:

the three-way solenoid valve 12 was switched on to pump the distillation water into the sulfur leaching reactor 2, the leached catalyst was allowed to stand and subjected to washing, the catalyst was washed by immersing in water for 4 h with the solid-liquid volume ratio of the catalyst to water of 1:5, the washed catalyst was dried in the catalyst dryer 8 at 100° C. for 30 hours, and the dried catalyst was placed in the catalyst storage tank 9 for storage.

The activities of the catalysts of Examples 1, 2, and 3 were as shown in the Table 1 below, where the lowest temperature at which the sulfur was completely converted during the catalytic reaction was expressed as $T_{100\%}$. The fresh catalyst was denoted by Q, the catalyst before regeneration was denoted by Q' and the catalyst after regeneration was denoted by Q''. From the table, it could be seen that the leaching rate of the elemental sulfur recovered from the sulfur-deposited catalyst in Examples 1, 2 and 3 was more than 98%. The regenerated catalysts could maintain a good apparent structure, moreover, the catalytic activity of the regenerated catalysts was significantly restored compared with the sulfur-deposited catalysts and $T_{100\%}$ was close to that of a fresh catalyst.

TABLE 1

| | Activity of the Catalyst | | | |
|---|---|---|---|---|
| | Q activity $T_{100\%}$/° C. | Q' activity $T_{100\%}$/° C. | Q'' activity $T_{100\%}$/° C. | Q' sulfur leaching efficiency/% |
| Example 1 | 312 | 468 | 320 | 98.2 |
| Example 2 | 315 | 471 | 324 | 98.9 |
| Example 3 | 309 | 465 | 315 | 98.5 |

What is claimed is:

1. A method of recovering elemental sulfur and the catalyst regenerating for a sulfur-deposited catalyst, comprising specific steps of:
    (1) immersing the sulfur-deposited catalyst in an ammonium sulfide solution, allowing to stand for a leaching reaction under ambient temperature and pressure for 6-10 hours, replacing the ammonium sulfide solution, and immersing again for extraction for the same time, wherein the leaching is repeated for more than two times;
    (2) collecting the leachate of step (1), then conducting gas stripping of the elemental sulfur by adopting the nitrogen gas of 90-110° C., condensing the tail gas of gas stripping, subjecting to a purification treatment and then discharging, and then the solid is filtered, washed and dried after the gas stripping to obtain the elemental sulfur; and
    (3) washing and drying the catalyst that has subjected to immersion and extraction for two times from step (1) to obtain a regenerated catalyst.

2. The method of recovering elemental sulfur and regenerating the catalyst for a sulfur-deposited catalyst according to claim 1, wherein in step (1) the mass fraction of the ammonium sulfide solution is 16.5%-20%.

3. The method of recovering elemental sulfur and regenerating the catalyst for a sulfur-deposited catalyst according to claim 1, wherein in step (1) the solid-liquid volume ratio of the sulfur-deposited catalyst to the ammonium sulfide solution is 1:3.5-6.

4. The method of recovering elemental sulfur and regenerating the catalyst for a sulfur-deposited catalyst according to claim 1, wherein in step (2) the condensate used during the condensation is the same ammonium sulfide solution as in step (1).

5. The method of recovering elemental sulfur and regenerating the catalyst for a sulfur-deposited catalyst according to claim 1, wherein in step (2) the purification treatment is a contact reaction between the tail gas and a alkali solution, the alkali solution is a calcium hydroxide solution, a sodium hydroxide solution or a potassium hydroxide solution, and the concentration of the alkali solution is 1.85-2.52 g/cm$^3$.

6. The method of recovering elemental sulfur and regenerating the catalyst for a sulfur-deposited catalyst according to claim 1, wherein in step (2) the drying temperature is 50-60° C.

7. The method of recovering elemental sulfur and regenerating the catalyst for a sulfur-deposited catalyst according to claim 1, wherein in step (3) the washing process is to immerse and clean the catalyst using the water for 3-5 times, and the solid-liquid volume ratio of the catalyst to water is 1:2.5-5.

8. The method of recovering elemental sulfur and regenerating the catalyst for a sulfur-deposited catalyst according to claim 1, wherein in step (3) the drying temperature is 80-100° C.

9. A system of recovering elemental sulfur and regenerating the catalyst for a sulfur-deposited catalyst, comprising a ammonium sulfide storage tank (1), a sulfur leaching reactor (2), a ammonium polysulfide storage tank (3), an elemental sulfur gas stripping reactor (4), a solid-liquid separator (5), an elemental sulfur dryer (6), a sulfur storage tank (7), a catalyst dryer (8), a catalyst storage tank (9), a cooling tower (10), a tail gas purification tower (11), a alkali solution storage tank (15), and a waste liquor storage tank (16);

wherein the ammonium sulfide storage tank (1) is connected to the top of the sulfur leaching reactor (2) through a pump (14), a three-way solenoid valve (12) and a two-way electrically operated valve (13) are disposed between the pump (14) and the sulfur leaching reactor (2), the three-way solenoid valve (12) is also connected to a distilled water pipe, and an inlet for the sulfur-deposited catalyst is provided on the top of the sulfur leaching reactor (2);

the bottom of the sulfur leaching reactor (2) is connected to the ammonium polysulfide storage tank (3) through a pump, the ammonium polysulfide storage tank (3) is connected to the elemental sulfur gas stripping reactor (4) through a pump, the elemental sulfur gas stripping reactor (4) is provided with an inlet for a high-temperature nitrogen gas at the bottom thereof, the bottom of the elemental sulfur gas stripping reactor (4) is connected to the solid-liquid separator (5) through a pump, the solid-liquid separator (5) is internally provided with a spraying device, the spraying device is connected to a distilled water pipe, the solid-liquid separator (5) is connected to the elemental sulfur dryer (6), the elemental sulfur dryer (6) is connected to the sulfur storage tank (7); the bottom of the solid-liquid separator (5) is connected to the sulfur leaching reactor (2) through a pump, and a two-way electrically operated valve is disposed between the pump and the sulfur leaching reactor (2);

the top of the elemental sulfur gas stripping reactor (4) is connected to the cooling tower (10), the cooling tower (10) is internally provided with a spraying device, the spraying device is connected to the ammonium sulfide storage tank (1) through the pump (14), a two-way electrically operated valve is arranged between the pump (14) and the cooling tower (10), the bottom of the cooling tower(10) is connected to the sulfur leaching reactor (2) through a pump, a two-way electrically operated valve is arranged between the pump and the sulfur leaching reactor (2), the top of the cooling tower (10) is connected to the lower portion of the tail gas purification tower (11), the tail gas purification tower (11) is provided with a tail gas outlet on the top thereof, the tail gas purification tower (11) is internally provided with a spraying device, the spraying device is connected to the bottom of the tail gas purification tower (11) through a circulation pump, a two-way electrically operated valve is arranged between the circulation pump and the spraying device, the spraying device is also connected to the alkali solution storage tank (15), a two-way electrically operated valve is arranged between the spraying device and the alkali solution storage tank (15), the circulation pump is also connected to the waste liquor storage tank (16), and a two-way electrically operated valve is arranged between the circulation pump and the waste liquor storage tank (16); and the bottom of the sulfur leaching reactor (2) is connected to the catalyst dryer (8), and the catalyst dryer is connected to the catalyst storage tank (9).

10. The system of recovering elemental sulfur and regenerating the catalyst for a sulfur-deposited catalyst according to claim 9, wherein the ammonium polysulfide storage tank (3) is internally provided with a stirring device.

* * * * *